(12) United States Patent
Cluff et al.

(10) Patent No.: US 7,089,449 B1
(45) Date of Patent: Aug. 8, 2006

(54) RECOVERING A SYSTEM THAT HAS EXPERIENCED A FAULT

(75) Inventors: Scott A. Cluff, Boise, ID (US); Raymond W. Thorn, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 925 days.

(21) Appl. No.: 09/706,960

(22) Filed: Nov. 6, 2000

(51) Int. Cl.
*G06F 11/00* (2006.01)

(52) U.S. Cl. ............................................. 714/15; 714/6
(58) Field of Classification Search ................ 714/5–7, 714/15; 711/162
See application file for complete search history.

(56) References Cited

U.S. PATENT DOCUMENTS

| | | | | |
|---|---|---|---|---|
| 4,972,316 A | * | 11/1990 | Dixon et al. ................. | 711/113 |
| 5,142,680 A | * | 8/1992 | Ottman et al. ............... | 717/176 |
| 5,455,933 A | * | 10/1995 | Schieve et al. ............... | 714/27 |
| 5,469,573 A | * | 11/1995 | McGill et al. ............... | 717/127 |
| 5,513,314 A | * | 4/1996 | Kandasamy et al. ........... | 714/6 |
| 5,615,330 A | * | 3/1997 | Taylor ............................ | 714/7 |
| 5,627,964 A | * | 5/1997 | Reynolds et al. ............. | 714/46 |
| 5,713,024 A | * | 1/1998 | Halladay ..................... | 717/168 |
| 5,765,151 A | * | 6/1998 | Senator ........................ | 707/8 |
| 5,805,882 A | * | 9/1998 | Cooper et al. ................. | 713/2 |
| 5,905,888 A | * | 5/1999 | Jones et al. .................... | 713/2 |
| 5,974,503 A | * | 10/1999 | Venkatesh et al. ........... | 711/114 |
| 6,016,553 A | * | 1/2000 | Schneider et al. ............ | 714/21 |
| 6,065,073 A | * | 5/2000 | Booth ........................... | 710/46 |
| 6,145,088 A | * | 11/2000 | Stevens .......................... | 714/2 |
| 6,173,417 B1 | * | 1/2001 | Merrill ......................... | 714/15 |
| 6,195,695 B1 | * | 2/2001 | Cheston et al. ............. | 709/221 |
| 6,314,532 B1 | * | 11/2001 | Daudelin et al. ............. | 714/38 |
| 6,324,654 B1 | * | 11/2001 | Wahl et al. ..................... | 714/6 |
| 6,374,366 B1 | * | 4/2002 | Maffezzoni ................... | 714/27 |
| 6,378,086 B1 | * | 4/2002 | Crowley et al. ............... | 714/7 |
| 6,381,694 B1 | * | 4/2002 | Yen ............................... | 713/2 |
| 6,393,585 B1 | * | 5/2002 | Houha et al. ................. | 714/23 |
| 6,446,175 B1 | * | 9/2002 | West et al. .................. | 711/162 |
| 6,535,998 B1 | * | 3/2003 | Cabrera et al. ............... | 714/15 |
| 6,578,160 B1 | * | 6/2003 | MacHardy et al. ........... | 714/43 |
| 6,701,450 B1 | * | 3/2004 | Gold et al. ..................... | 714/5 |
| 2002/0042892 A1 | * | 4/2002 | Gold ............................. | 714/6 |
| 2002/0091710 A1 | * | 7/2002 | Dunham et al. ............. | 707/200 |

OTHER PUBLICATIONS

Stevens, "Introduction", TCP/IP Illustrated, vol. 1: The Protocols, Addison-Wesley, 1994, p. 1.*

(Continued)

*Primary Examiner*—Scott Baderman
*Assistant Examiner*—Gabriel Chu
(74) *Attorney, Agent, or Firm*—Trop, Pruner & Hu, PC

(57) ABSTRACT

A method and system of recovering a system that has experienced a fault includes a backup device to enable access of a network through the interface in response to the fault. The system includes a main operational portion that controls operation of the system under normal conditions. However, if a fault occurs, then the backup device can be selected to take over control of the system so that data can be retrieved from a backup storage to recover the system. The backup device includes software and/or hardware components to enable the system to access a network even though the main operational portion may not be functioning properly.

18 Claims, 3 Drawing Sheets

OTHER PUBLICATIONS

"Browser", Wikipedia.org [http://en.wikipedia.org/wiki/Browser].*

"Browser", Merriam-Webster Online [http://m-w.com/cgi-bin/dictionary?book=Dictionary&va=browser&x=0&y=0].*

"Browser", TechEncyclopedia [http://www.techweb.com/encyclopedia/defineterm.jhtml;jsessionid=MCW15NC5D-5F0OQSNDBCSKH0CJUMEKJVN?term=browser&x=0&y=0].*

* cited by examiner

RECOVERING A SYSTEM THAT HAS EXPERIENCED A FAULT

TECHNICAL FIELD

The invention relates to recovery of systems that have experienced faults.

BACKGROUND

Improvements in technology have provided users with a wide variety of devices to perform various tasks. Examples of such devices include desktop computer systems, portable computer systems, personal digital assistants (PDAs), mobile telephones, and so forth. The devices are relatively sophisticated devices that include processing elements (e.g., microprocessors or microcontrollers) and storage devices (e.g., hard disk drives, dynamic random access memorys or DRAMs, and so forth).

A typical device includes an operating system (e.g., a WINDOWS® operating system, a UNIX operating system, a LINUX operating system, etc.) that is loaded when the device is started. Application software is also loaded into the device to provide useful functions for users. Example applications include word processing applications, electronic mail applications, web browsing applications, calendar and address book applications, and so forth.

Despite improvements in technology, failures in various components of a device remains a persistent problem. When a component of a device, such as a hard disk drive, fails, the user may be left with an inoperational device. One option for the user is to take the device to a repair shop where an attempt may be made to recover the failed component, such as the failed hard disk drive. In some cases, data on the hard disk drives may be recovered so that loss of data is minimized. However, in many other cases, the data stored on the hard disk drive is lost, unless the user has diligently backed up the data.

Conventionally, recovery of the failed component such as the hard disk drive is an arduous process that often is frustrating for the user. A need thus exists for an improved method and apparatus for recovering a device to an operational state after a failure has occurred.

SUMMARY

In general, according to one embodiment, a system comprises an interface to a network and a first operational element to perform one or more tasks in the system. A storage element contains a flag to indicate if a fault has occurred with the first operational element. A backup device enables access to the network through the interface in response to the flag indicating failure of the first operational element.

In general, according to another embodiment, a system comprises a main storage device, a backup storage device, and a routine executable to boot from the backup storage device in case of a system fault. The backup storage device enables access over a network to retrieve data from a network node to recover the system.

Other features and embodiments will become apparent from the following description, from the claims, and from the drawings.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
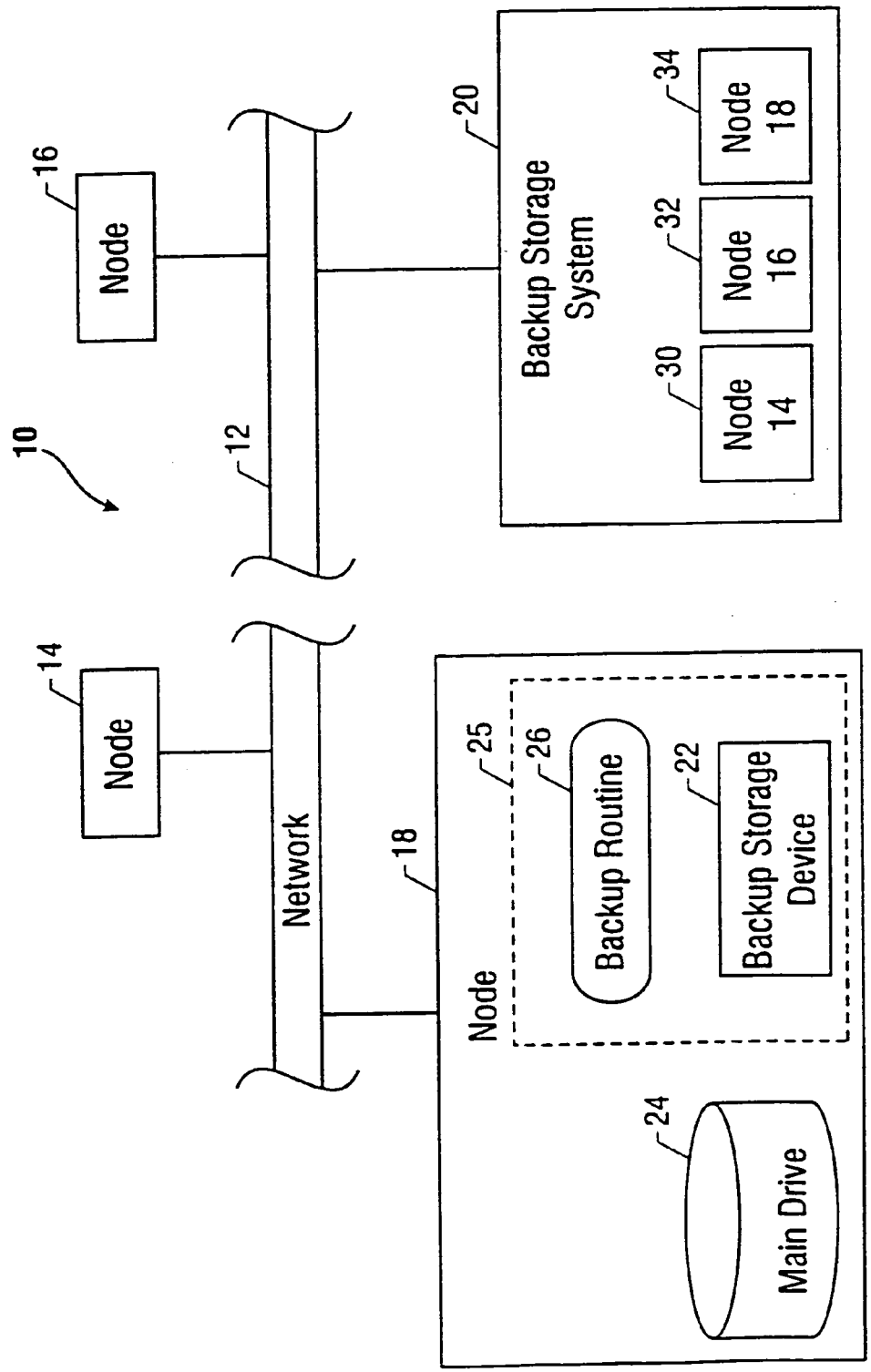
FIG. 1 is an embodiment of a network system including a network, various nodes coupled to the network, and a backup storage system.

Referring to FIG. 1, a network system 10 includes a network 12 that is coupled to network nodes 14, 16, and 18. Examples of the nodes 14, 16, and 18 include desktop computer systems, portable computer systems, and other types of systems having access to the network 12 (over either wired or wireless connections). Examples of the network 12 include local area networks (LANs), wide area networks (WANs), the Internet, and so forth.

A backup storage system 20 accessible over the network 12 stores data to be used to recover nodes 14, 16, and 18 in case of a fault (such as a component experiencing an error or failure) occurring in the nodes. The data stored in the backup storage system 20 includes user data, such as user-created documents or files, electronic mail messages, calendar and address book files, and so forth. The data stored in the backup storage system also includes software, such as operating system and application software that are stored and executed in each of the nodes. In one embodiment, the user data and software are stored as image data 30, 32, and 34 that correspond to nodes 14, 16, and 18, respectively. Thus, in case of a fault in node 14, the image data 30 is retrieved from the backup storage system 20 and communicated to the node 14, with the image data used to recover the node 14. Similarly, image data 32 and 34 are used to recover nodes 16 and 18, respectively.

As illustrated, the node 18 includes a main hard disk drive 24, a backup storage device 22, and a backup routine 26 executable in the node 18. The backup routine 26 is initially stored on the backup storage device 22 and is executable to enable the node 18 to access the backup storage system 20 over the network 12 in case one of several predetermined faults occurs in the node 18. Examples of such predetermined faults include failure of the hard disk drive, an unrecoverable error occurring on the hard disk drive, corrupted software and files associated with the software (e.g., library files, etc.), and so forth. The backup routine 26 and the backup storage device 22 may be collectively be referred to as the "backup device 25." In the illustrated embodiment, the backup routine 26 is a software routine loaded from the backup storage device 22 for execution on a processing element in the node 18. Alternatively, the backup device is a hardware component that performs backup tasks in response to detection of certain types of faults.

More generally, the node 18 includes a main operational portion, which in one embodiment contains the main hard disk drive 24 (or some other type of storage element). The main operational portion controls operation when the node 18 functions normally. The main hard disk drive 24 stores the operating system and application software, which are loaded into the node 18 to perform useful tasks. In case of some predetermined faults, the backup device 25 is used to enable access over the network 12 to the backup storage system 20 to retrieve data to recover the main operational portion of the node 18.

The backup storage device 22 can be implemented in a number of different ways. For example, the backup storage device 22 can be a bootable mini-drive that is mounted inside the chassis of or on a motherboard in the node. The mini-drive can be a hard disk drive having a relatively small storage capacity for reduced cost. Alternatively, the mini-drive can be other types of non-volatile memory, such as flash memory, electrically erasable and programmable read-only memory (EEPROM) devices, and so forth. Instead of a separate component in the chassis of each node, the mini-drive can also be integrated onto the motherboard of the node if its size permits. Alternatively, the backup storage device 22 can be a full form factor drive.

The backup storage device 22 can also include a compact disk (CD) or digital video disk or digital versatile disk (DVD) drive in which a CD or DVD is loaded. The CD or DVD contains the necessary software to enable the node 18 to access the network 12. Alternatively, the backup storage device 22 includes a partition on the main hard disk drive 24. It is likely that only one part of the hard disk drive 24 is corrupted while another portion is not corrupted. The backup storage device 22 can also include other bootable cartridges or drives.

An example of the backup routine 26 is a browser that is capable of executing on a processor in each node to gain access to the network 12. To avoid having to load a large operating system such as the WINDOWS® operating system, the browser can be a reduced version browser that does not need standard full-scale computer operating systems to run. Examples of such "mini-browsers" include browsers that run in PDAs and other handheld devices. Alternatively, mini-browsers can be designed to operate in a DOS operating system, a WINDOWS® CE operating system, or other "lite" operating systems.

Figure 2:
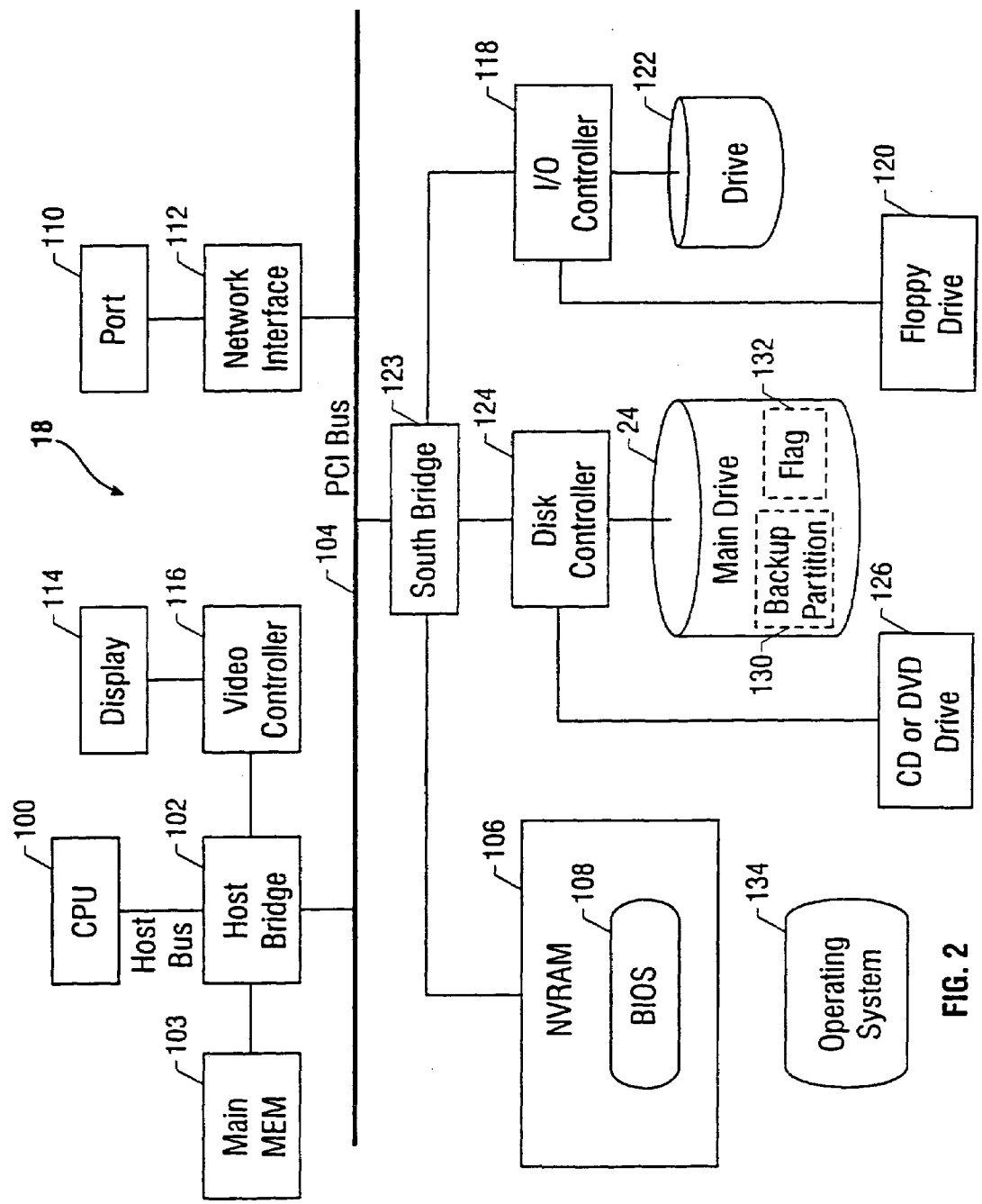
FIG. 2 is a block diagram of components of a node of FIG. 1, in accordance with an embodiment.

Referring to FIG. 2, an example of the node 18 (which has a similar arrangement as nodes 14 and 16) is illustrated. The node 18 includes a central processing unit (CPU) 100 that forms the processing core of the node 18. A host bridge 102 is connected over a host bus to the CPU 100. The host bridge 102 is also connected to a system bus 104, such as a Peripheral Component Interconnect (PCI) bus. Additionally, the host bridge 102 contains control elements to interface a main memory 103 and a video controller 116 that controls presentation of images on a display 114. The system bus 104 is connected to a network interface 112 that manages communications to the network 12 through a port 110.

Other components of the node 18 include a south bridge 123 coupled to the system bus 104. The south bridge 123 is in turn coupled to a disk controller 124 that is connected to the main disk drive 24. The disk controller 124 can also manage communications with a CD and/or DVD drive 126. An input/output (I/O) controller 118, which is connected to a floppy disk drive 120 and to a mini-drive 122, is also coupled to the south bridge 123.

When the node 18 first starts up, a basic input/output system (BIOS) routine 108 is loaded to perform boot and initialization tasks. The BIOS routine 108 is stored in a non-volatile memory 106, which can be a flash memory, EEPROM, and other like memory devices. Access to the non-volatile memory 106 is provided through the south bridge 123.

The backup storage device 22 of FIG. 1 can be one or more of the following elements in the node 18: the mini-drive 122, the CD or DVD drive 126, the floppy drive 120, the backup partition 130 in the main hard disk drive 24, or an additional drive like the main drive 24.

Although not shown, the node also includes various layers and stacks to enable communications over the network 12. For example, a network stack can include a TCP/IP (Transmission Control Protocol/Internet Protocol) or a UDP/IP (User Datagram Protocol/Internet Protocol) stack. TCP is described in RFC 793, entitled "Transmission Control Protocol," dated September 1981; and UDP is described in RFC 768, entitled "User Datagram Protocol," dated August 1980. One version of IP is described in Request for Comments (RFC) 791, entitled "Internet Protocol," dated September 1981; and another version of IP is described in RFC 2460, entitled "Internet Protocol, Version 6 (IPv6) Specification," dated December 1998. TCP and UDP are transport layers for managing connections over an IP network.

Also, various services enable the communication of requests over the network 12, such as requests between a node and the backup storage system 20. One such service is the Hypertext Transport Protocol (HTTP) service, which enables requests sent from one network element to another and responses from the destination network element to the requesting network element.

Figure 3:
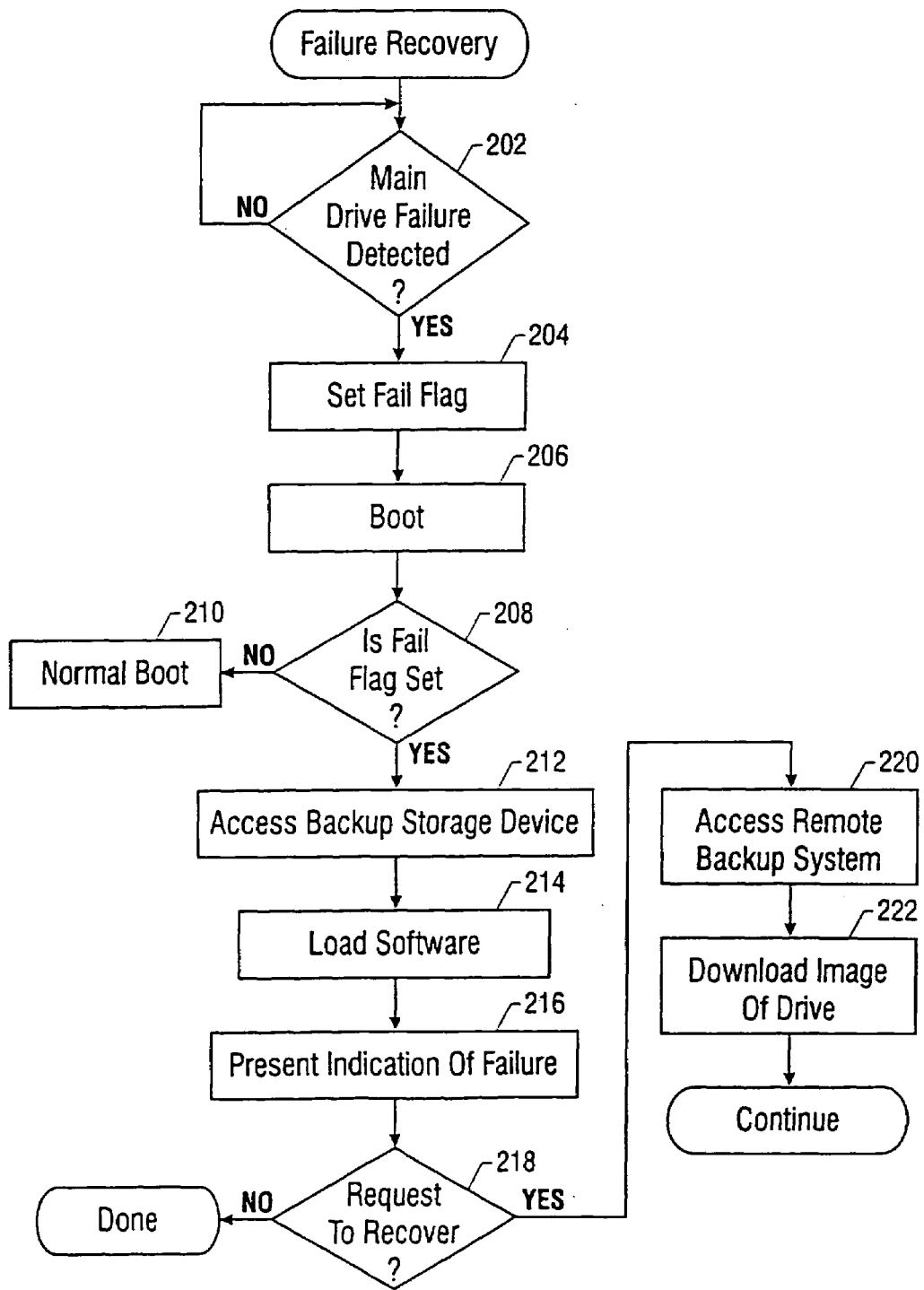
FIG. 3 is a flow diagram of tasks performed for a failure recovery in the node of FIG. 2, in accordance with an embodiment.

Referring to FIG. 3, the failure recovery process performed in one of the nodes 14, 16, and 18 is illustrated. The operating system 134 determines (at 202) if the node has experienced a fault. If so, the operating system 134 sets (at 204) a fail flag 132 (in the main hard disk drive 24) to an active state. Alternatively, the fail flag can be stored in the non-volatile memory 106, the mini-drive 122, or another memory storage element in the node.

Next, either in response to a user request to restart or automatically upon detection of the fault, the node is rebooted (at 206). When the node starts up, the BIOS routine 108 is loaded to perform boot tasks. One of the tasks performed by the BIOS routine 108 is to determine if the fail flag 132 has been set (at 208). If not, a normal boot process is performed (at 210) by the BIOS routine 108. If the fail flag 132 is set, then the BIOS routine 108 accesses (at 212) the backup storage device 22. Alternatively, instead of automatically checking for the fail flag 132, the boot from the backup storage device 22 can be performed manually by a user through the BIOS (such as by selecting the boot drive). Software on the storage device 22, including the backup routine 26, is loaded (at 214) into the node for execution on the CPU 100. As noted above, the backup routine 26 can be a mini-browser that enables communications over the network 12.

The backup routine 26 presents an indication of the fault (at 216), such as displaying a warning on the display 114. The backup routine 26 then waits (at 218) for a user request to recover. If a request to recover the node is received, then the backup routine 26 accesses (at 220) the remote backup system 20 over the network 12. Image data (30, 32, or 34) is retrieved from the backup storage system 20 and downloaded (at 222) into the node, where the image data is used to recover the node. A scan disk operation may be performed to determine portions of the hard disk drive that are defective. The image data can then be copied to the remaining portions of the hard disk drive 24 to enable normal operation of the node.

The various software routines or modules described herein may be executable on various processing elements. Such processing elements include microprocessors, microcontrollers, processor cards (including one or more microprocessors or microcontrollers), or other control or computing devices. As used here, a "controller" can refer to either hardware or software or a combination of the two.

The storage units include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; or optical media such as CDs or DVDs. Instructions that make up the various software routines or modules when executed by a respective processing element cause the corresponding node to perform programmed acts.

The instructions of the software routines or programs are loaded or transported into the node in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the node. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system comprising:
   an interface to a network;
   a first operational element to perform one or more tasks in the system;
   a storage element containing a flag to indicate if a fault has occurred with the first operational element; and
   a backup device to enable access of the network through the interface in response to the flag indicating failure of the first operational element.

2. The system of claim 1, wherein the first operational element comprises a disk drive.

3. The system of claim 1, wherein the interface comprises a network stack having an Internet Protocol (IP) layer, wherein the backup device comprises a backup storage element containing a backup routine adapted to perform communications through the network stack including the IP layer to the network.

4. The system of claim 3, wherein the backup routine comprises a browser.

5. The system of claim 3, wherein the first operational element comprises a first disk drive, and wherein the backup storage element comprises a second disk drive separate from the first disk drive.

6. The system of claim 5, wherein the second disk drive has a smaller storage capacity than the first disk drive.

7. The system of claim 3, wherein the backup storage element comprises non-volatile memory.

8. The system of claim 3, wherein the backup device is adapted to retrieve an image containing user data and operating system software over the network in response to the flag.

9. The system of claim 1, wherein the first operational element comprises a disk drive having plural partitions, and wherein the backup device comprises one of the partitions.

10. The system of claim 1, wherein the backup device comprises a removable disk drive.

11. The system of claim 1, the backup device to retrieve user data and software over the network to recover the system.

12. The system of claim 11, wherein the software comprises operating system software.

13. The system of claim 1, wherein the first operational element comprises a storage element, the backup device to retrieve an image of the storage element to recover the storage element to its operational state.

14. The system of claim 1, further comprising a BIOS routine to detect a state of the flag, the BIOS routine to access the backup device in response to detecting that the flag indicates the fault.

15. A method of performing error recovery in a system, comprising:
   detecting if an operating portion of the system has experienced a fault;
   accessing a backup device to enable communication through a network stack including an Internet Protocol (IP) layer over a network;
   retrieving data through the network stack including the IP layer over the network, the data comprising an image containing user data and an operating system;
   recovering the system using the image; and
   loading a backup software routine from the backup device,
   wherein the backup software routine comprises a browser, the method further comprising executing the browser to access the network through the network stack including the IP layer to retrieve the data.

16. A method of performing recovery in a system having a main storage device and a backup storage device, comprising:
   booting from a backup storage device instead of the main storage device if the system has experienced a fault;
   using the backup storage device to enable communications through a network stack including an Internet Protocol (IP) layer over a network to retrieve an image to recover the system, wherein the image comprises user data and an operating system; and
   loading a routine from the backup storage device to enable the network communication through the network stack including the IP layer,
   wherein loading the routine comprises loading a browser.

17. An article comprising at least one storage medium containing instructions that when executed cause a system to:
   detect if an operating portion of the system has experienced a fault;
   access a backup device to enable communication over a network;
   retrieve data to recover the system over the network;
   in response to the fault, scan a storage device to identify portions of the storage device that are defective;
   store the retrieved data in portions of the storage device other than the portions that are identified to be defective by the scan,
   wherein retrieving the data comprises retrieving an image containing user data and operating system software;
   set a flag in response to the fault, the flag to indicate that the system has experienced the fault;
   load a BIOS routine to detect whether the flag is set; and
   cause the BIOS routine to load a second routine in response to detecting the flag is set, the second routine to retrieve the data to recover the system over the network.

18. The article of claim 17, wherein storing the retrieved data comprises storing the retrieved image containing the user data and operating system software in the portions of the storage device other than the portions that are identified to be defective by the scan.

* * * * *